(12) United States Patent  (10) Patent No.: US 9,118,599 B2
Jones  (45) Date of Patent: Aug. 25, 2015

(54) NETWORK TESTING USING A CONTROL SERVER

(71) Applicant: Verizon Patent and Licensing Inc., Basking Ridge, NJ (US)

(72) Inventor: Lawrence W. Jones, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 224 days.

(21) Appl. No.: 13/666,222

(22) Filed: Nov. 1, 2012

(65) Prior Publication Data

US 2013/0272146 A1 Oct. 17, 2013

Related U.S. Application Data

(60) Provisional application No. 61/623,973, filed on Apr. 13, 2012, provisional application No. 61/638,807, filed on Apr. 26, 2012.

(51) Int. Cl.
*H04L 12/26* (2006.01)

(52) U.S. Cl.
CPC ..................... *H04L 43/50* (2013.01)

(58) Field of Classification Search
None
See application file for complete search history.

(56) References Cited

U.S. PATENT DOCUMENTS

| | | | |
|---|---|---|---|
| 2006/0230139 A1* | 10/2006 | Locke | 709/224 |
| 2008/0109680 A1* | 5/2008 | Kodaka et al. | 714/38 |
| 2009/0207752 A1* | 8/2009 | Bugenhagen | 370/252 |
| 2009/0279673 A1* | 11/2009 | Maffre et al. | 379/1.03 |
| 2009/0292821 A1* | 11/2009 | Grib et al. | 709/238 |
| 2011/0038364 A1* | 2/2011 | Monsieux et al. | 370/352 |
| 2011/0225641 A1* | 9/2011 | Wu et al. | 726/9 |
| 2012/0016985 A1* | 1/2012 | Tullberg et al. | 709/224 |
| 2012/0230193 A1* | 9/2012 | Fang | 370/235 |
| 2012/0233503 A1* | 9/2012 | Ozawa et al. | 714/27 |

* cited by examiner

*Primary Examiner* — Jason Mattis
*Assistant Examiner* — Adnan Baig

(57) ABSTRACT

A system may receive a test signal from a first server; monitor network activity associated with the device; determine when the device is in an idle state based on the network activity associated with the device; generate a first packet based on receiving the test signal and based on determining when the device is in the idle state; provide the first packet to a second server; receive a second packet from the second server based on providing the first packet to the second server, the second packet authorizing the device to perform the network test; communicate with a third server, associated with the second packet, to perform the network test independently of the first and/or second server; generate test results based on performing the network test; and provide the test results to the second server, the second server being capable of generating performance data based on the test results.

20 Claims, 10 Drawing Sheets

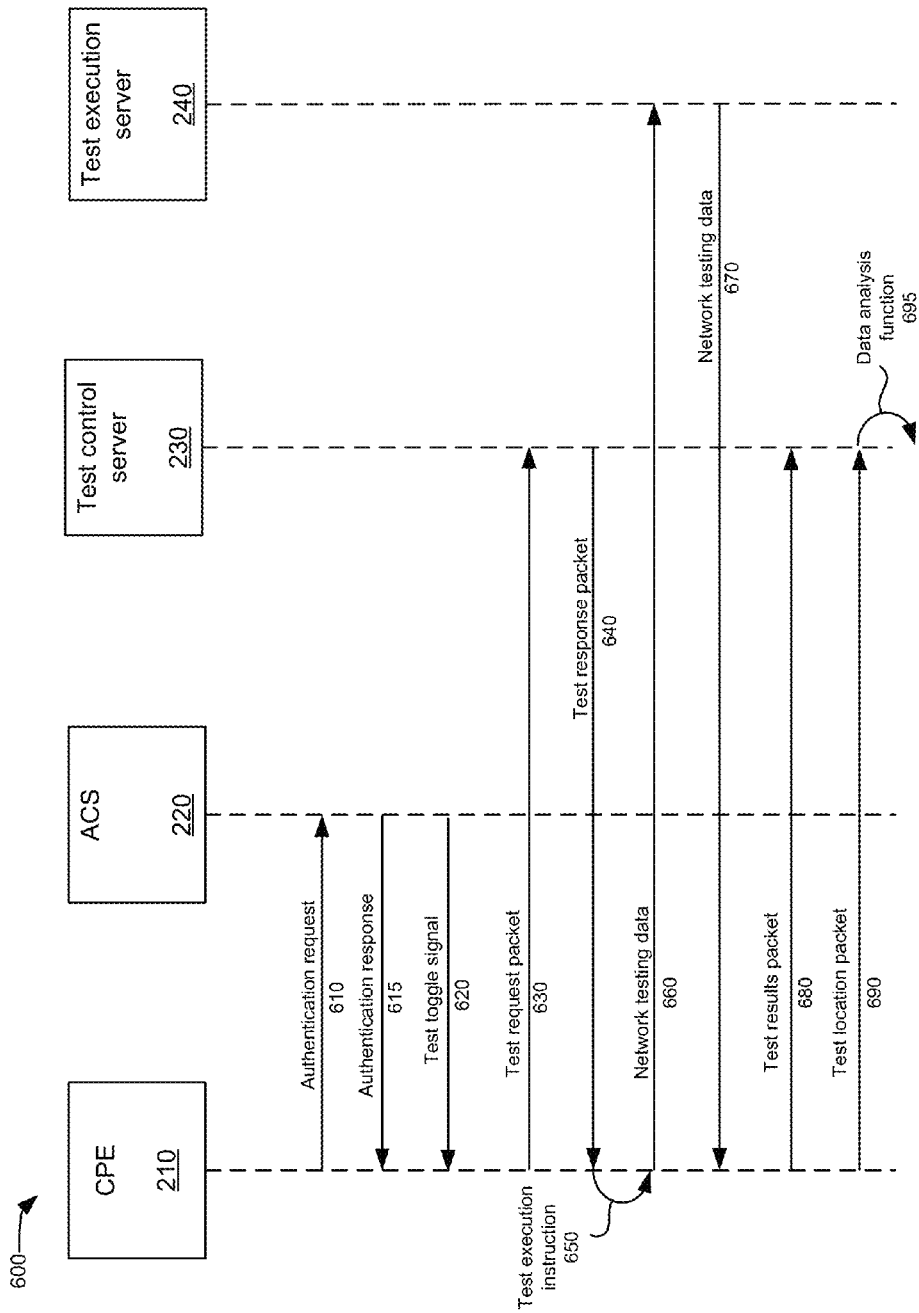

NETWORK TESTING USING A CONTROL SERVER

RELATED APPLICATIONS

This application claims priority to provisional U.S. Patent Application No. 61/623,973, filed on Apr. 13, 2012 and to provisional U.S. Patent Application No. 61/638,807, filed on Apr. 26, 2012. The entire content of provisional U.S. Patent Application No. 61/623,973 and of provisional U.S. Patent Application No. 61/638,807 is incorporated herein by reference.

BACKGROUND

Home modems, or other network devices, are sometimes used to provide network services to user devices. Typically, an auto-configuration server (ACS), such as an ACS in accordance with the TR-69 standard, may be used to test the home modems regarding network speed, network quality, and/or some other network performance indication. Performing the tests, via the ACS, may place significant load on the ACS and may reduce network performance.

BRIEF DESCRIPTION OF THE DRAWINGS

FIG. 6 illustrates a call flow diagram of example operations capable of being performed by an example portion of the environment of FIG. 2;

DETAILED DESCRIPTION OF THE PREFERRED EMBODIMENTS

Figure 1:
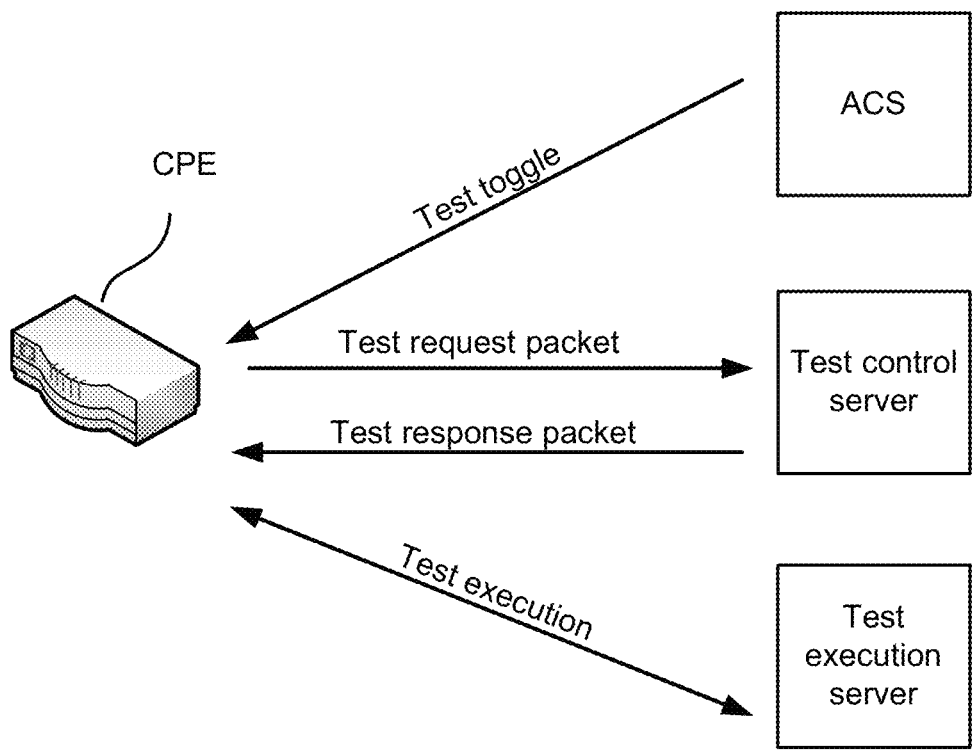
FIG. 1 illustrates an example overview of an implementation described herein.

The following detailed description refers to the accompanying drawings. The same reference numbers in different drawings may identify the same or similar elements.

Systems and/or methods, described herein, may test the performance of customer premises equipment (CPE), or some other network device (e.g., a, router, a switch, a gateway, a combined router/modem, a set-top box, etc.) associated with a service provider (e.g., an internet service provider), independently of an ACS. For example, the CPE may communicate with a test control server and/or a test execution server to perform the test independently of the ACS. In some implementations, the systems and/or methods may provide network throughput performance tests based on a testing standard, such as the TR-143 performance test standard. Additionally, or alternatively, the systems and/or methods may provide some other network performance test based on some other testing standard.

In some implementations, while a test may be performed independently of the ACS, the ACS may be used to provision the CPE to access a network such that the CPE may be used to provide network services (e.g., internet connection services). Additionally, or alternatively, the ACS may toggle a test function on the CPE to direct the CPE to perform network tests, independently of the ACS.

In some implementations, the CPE may communicate with the test control server at regular intervals (e.g., at 1 hour intervals, or some other interval) and/or when the CPE is considered to be in an idle state (e.g., with respect to user activity) such that a test control server may monitor the network performance of the CPE (e.g., download speeds, upload speeds, ping times, packet loss, etc.). The CPE may provide the test control sever with a request packet including information regarding a request for authorization to perform a test, a type of test to perform (e.g., a download test, an upload test, and/or some other test), and/or some other information.

In some implementations, the test control server may receive the request packet and may store information in the request packet to form a response packet. For example, the response packet may include information identifying whether the CPE is authorized to perform the test (e.g., based on available network resources to perform the test and/or based on some other factor). Additionally, or alternatively, the response packet may include information regarding test parameters (e.g., test types to perform, a uniform resource locator (URL) link for a test execution server used to perform the test, etc.).

In some implementations, the CPE may perform the test based on the information received and/or stored by the response packet. As described above, the CPE may perform the test independently of the ACS. As a result, the CPE may be tested at regular intervals (e.g., at 1 hour intervals, or some other interval) and/or when the CPE is considered to be in an idle state while saving network load associated with the ACS.

FIG. 1 illustrates an example overview of an implementation described herein. In FIG. 1, assume that a CPE is associated with an ACS and that the ACS provisions the CPE to communicate with a network to provide network services (e.g., internet connection services). The ACS may send a test toggle signal to the CPE to direct the CPE to perform tests. The CPE may initiate a test operation based on receiving the test toggle signal from the ACS. In some implementations, the test operation may direct the CPE to generate a test request packet and to send the test request packet to a test control server at regular intervals and/or when the CPE is considered to be in an idle state. As described above, the test control server may receive the test request packet and may store information in the test request packet to form a test response packet.

In some implementations, the test toggle signal may function as an "on/off switch" for dictating when a CPE is to perform network tests and when the CPE is not to perform network tests. For example, the ACS may send the test toggle signal to a first CPE to cause the first CPE to perform network tests and may send the test toggle signal to a second CPE to prevent the second CPE from performing network tests. At some later point in time, the ACS may send the test toggle signal to the first CPE to prevent the first CPE from performing network tests and may send the test toggle signal to the second CPE to cause the second CPE to perform network tests. As a result, the ACS may be used to provide network load-balancing functions to balance network resources associated with performing network tests.

In some implementations, and as shown in FIG. 1, the test control server may provide the test response packet to the CPE. The test response packet may include an indication that the CPE is authorized to perform a network test (e.g., based on available network resources and/or some other factor). Additionally, or alternatively, the response packet may include information identifying test parameters, such as a test type (e.g., a hypertext transfer protocol (HTTP) download test, an HTTP upload test, a file transfer protocol (FTP) test, a domain name system (DNS) response time test, a web page response time test, and/or some other test type) and/or a URL for a test execution server in which to perform the tests based on the test parameters. In some implementations, the test parameters may relate to tests to identify network quality, network speed, network performance, and/or network outages. For example, the HTTP download test may identify a download speed of the CPE using the HTTP protocol and the HTTP upload test may identify an upload speed of the CPE using the HTTP protocol.

As further shown in FIG. 1, the CPE may identify the test execution server based on the URL stored by the test response packet or provisioned by the ACS, and may execute the test with the test execution server. In some implementations, the test execution server, the test control server, the ACS, and/or the CPE, may each be associated with different parties so that network resources, associated with performing a network test, may be distributed among different parties. As a result, the test may be performed independently of the ACS, thereby saving network load associated with the ACS.

In some implementations, the CPE may send test results data or location data (e.g., geographic location and/or network location of the CPE) to the test control server. The test control server may store the test results data and/or the location data and may generate performance indications to identify network outages by location. Additionally, or alternatively, the test control server may generate performance indications to identify whether the CPE is performing within operating parameters. For example, the performance indications may identify whether the network speed, associated with the CPE, satisfies a threshold (e.g., a threshold associated with an advertised network speed of the CPE).

Figure 2:
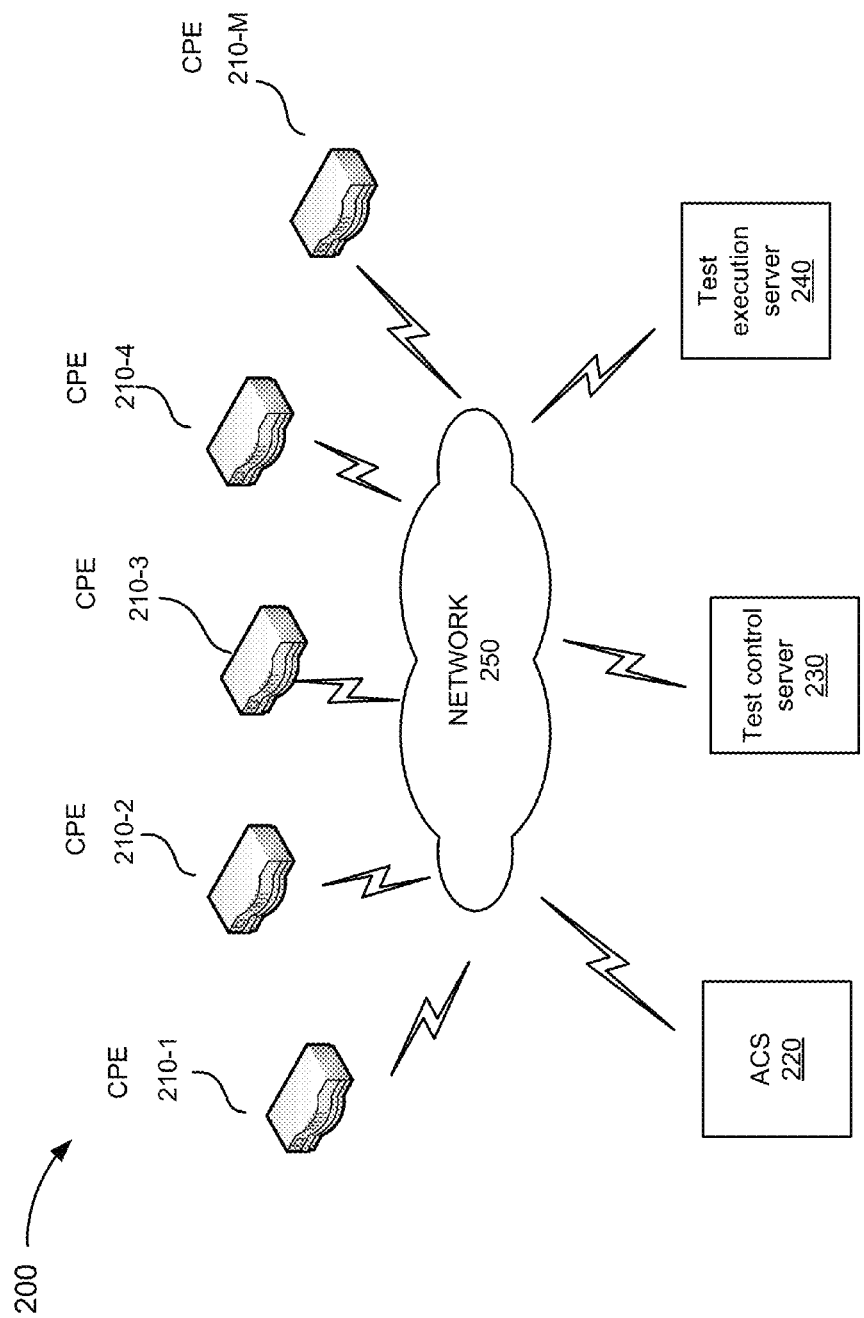
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include CPEs 210-1, 210-2, . . . , 210-M (where M≥1) (collectively referred to as "CPEs 210," and individually as "CPE 210"), ACS 220, test control server 230, test execution server 240, network 250. While FIG. 2 shows a particular quantity and arrangement of devices, in practice, environment 200 may include additional devices, fewer devices, different devices, or differently arranged devices than are shown in FIG. 2. For example, each of ACS 220, test control server 230, and/or test execution server 240 may be implemented as multiple, possibly distributed, devices. Alternatively, ACS 220, test control server 230, and/or test execution server 240 may be implemented within a single device. Further, a function described as being performed by one device may be performed by another device.

CPE 210 may include a device capable of communicating via a network, such as network 250. For example, CPE 210 may correspond to router, a switch, a gateway, a hub, a network adapter (e.g., a wireless fidelity (WiFi) adapter), a set-top box, a voice over internet protocol (VOIP) device, and/or some other similar type of device. In some implementations, CPE 210 may communicate with network 250 to provide network services (e.g., internet connection services) to a user device (e.g., a desktop computer, a portable computer, a smart phone, a tablet computer, etc.). CPE 210 may receive authentication from ACS 220 to access network 250 and may communicate with test control server 230 and/or test execution server 240 to perform tests to assess network performance and/or performance of CPE 210. In some implementations, environment 200 may include a quantity of CPEs 210 in the thousands or in the tens of thousands that may be geographically distributed.

ACS 220 may include a computing device, such as a server device, or a collection of service devices that is capable of provisioning CPE 210 such that CPE 210 may access network 250. In some implementations, ACS 220 may send a test toggle signal to CPE 210 to direct CPE 210 to perform network testing functions (e.g., test request packet generation, test execution functions, etc.) or to stop performing network testing functions.

Test control server 230 may include a computing device, such as a server device, or a collection of service devices. In some implementations, test control server 230 may receive a test request packet from CPE 210, may store data in the test request packet to form a test response packet, and may provide the test response packet to CPE 210.

Test execution server 240 may include a computing device, such as a server device, or a collection of service devices. In some implementations, test execution server 240 may send/receive network data, associated with a test, to/from CPE 210. For example, test execution server 240 may send data relating to an HTTP download test of CPE 210, an HTTP upload test of CPE 210, an FTP download test of CPE 210, a DNS response time test, a web page response time test, and/or relating to some other test of CPE 210. In some implementations, test execution server 240 may be associated with a different party (e.g., a different company) than CPE 210, ACS 220, and/or test control server 230 such that network resources, associated with performing a network test, may be distributed among several parties.

Network 250 may include any type of network or a combination of networks. For example, network 250 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic, or a combination of networks. Each of CPE 210, ACS 220, test control server 230, and/or test execution server 240 may connect to network 250 via a wireless connection, a wired connection, or a combination thereof.

In some implementations, CPE 210, ACS 220, test control server 230, and/or test execution server 240 may communicate via network 250 using HTTP, HTTP secure (HTTPS), and/or some other type of protocol.

Figure 3:
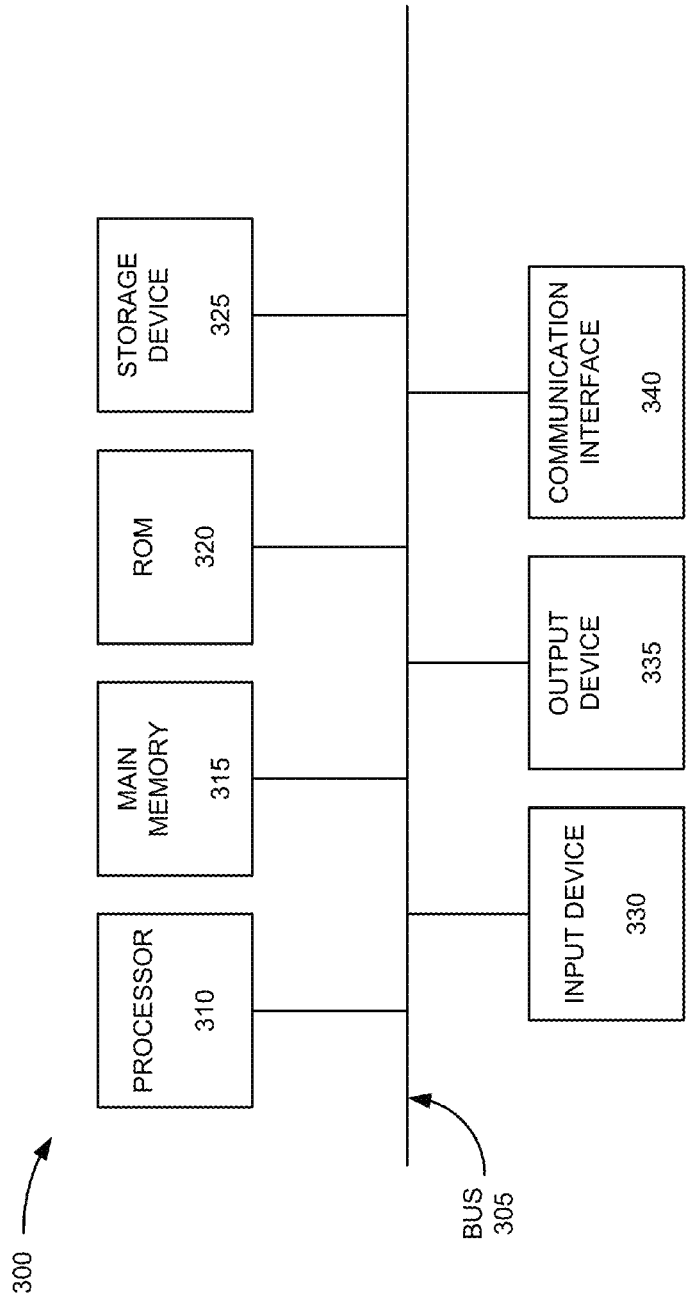
FIG. 3 illustrates example components of a device that may be used within the environment of FIG. 2.

FIG. 3 illustrates example components of a device 300 that may be used within environment 200 of FIG. 2. Device 300 may correspond to CPE 210, ACS 220, test control server 230, and/or test execution server 240. Each of CPE 210, ACS 220, test control server 230, and/or test execution server 240 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
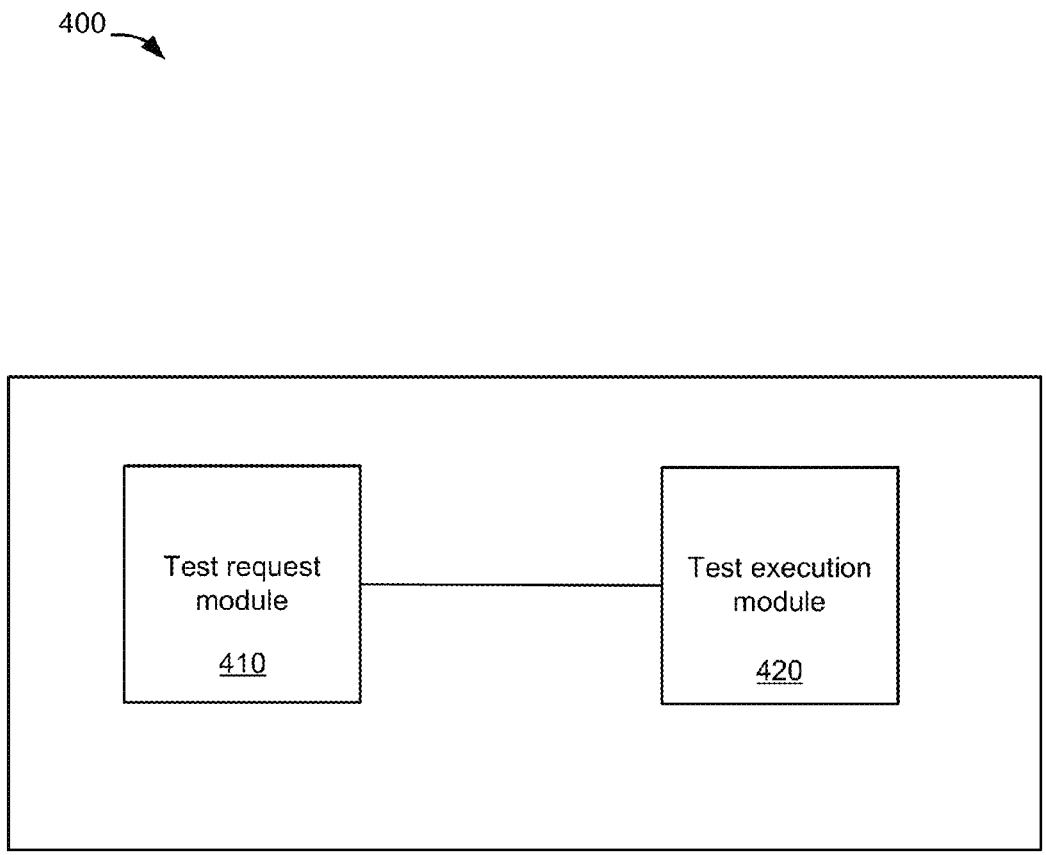
FIG. 4 illustrates example functional components of an example system.

FIG. 4 illustrates example functional components of an example system 400. In some implementations, system 400 may include functional components implemented by a device, such as CPE 210. In some other implementations, system 400 may include functional components implemented by one or more devices, which may include or exclude CPE 210. For example, ACS 220, test control server 230, and/or test execution server 240 may include some or all of the functional components of system 400.

As shown in FIG. 4, system 400 may include test request module 410 and test execution module 420.

In some implementations, test request module 410 may receive a test toggle signal to direct test request module 410 to perform network test functions (e.g., functions relating to generating a test request packet). Additionally, test request module 410 may receive a test toggle signal to direct test request module 410 to stop performing network test functions. In some implementations, test request module 410 may generate a test packet based on the test toggle signal directing test request module 410 to perform network test functions. As described above, the test packet may include information, such as a request to perform a test, types of tests to perform, and/or some other information.

In some implementations, test request module 410 may provide the test request packet to test control server 230 at regular intervals (e.g., 1 hour intervals or some other interval) and/or when CPE 210 is considered to be in an idle state. For example, test request module 410 may monitor network activity of CPE 210, and may identify when network activity of CPE 210 satisfies a threshold relating to when CPE 210 is considered to be in an idle state (e.g., a threshold of less than 10 megabytes of data transferred to/from CPE 210 within a 1 hour time interval may correspond to when CPE 210 is considered to be in an idle state).

Test execution module 420 may receive a test response packet from test control server 230 based on test request module 410 providing the test request packet to test control server 230. As described above, the test response packet may include information relating to test parameters, such as a test type (e.g., an HTTP upload test, an HTTP download test, a file transfer protocol (FTP) test, etc.), a URL of a particular test execution server 240 to communicate with as part of the test and/or some other information (e.g., information to define test intervals in which subsequent tests may be performed by CPE 210).

In some implementations, test execution module 420 may communicate with test execution server 240 (e.g., a server associated with the URL stored by the test response packet) to perform a test based on the test parameters stored by the test response packet. For example, test execution module 420 may perform a throughput test based on standard, such as the TR-143 standard and/or based on some other standard. Additionally, test execution module 420 may store test results and/or provide the test results to test control server 230. In some implementations, test execution module 420 may perform a network test based on receiving the test response packet and may not perform the network test when a test response packet is not received (e.g., when the a request to perform the network test "times-out" or goes otherwise unanswered).

Figure 5:
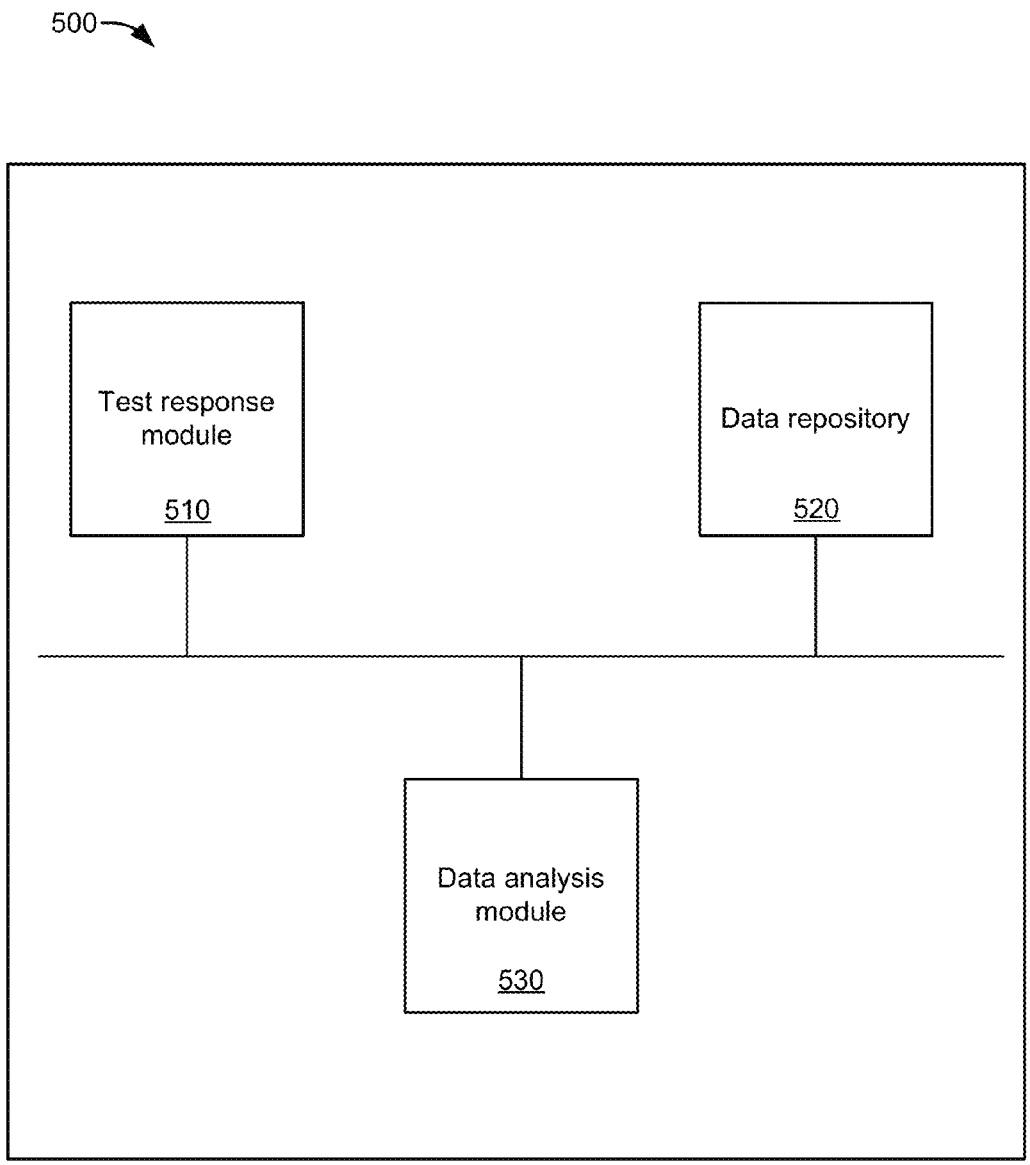
FIG. 5 illustrates example functional components of an example system.

FIG. 5 illustrates example functional components of an example system 500. In some implementations, system 500 may include functional components implemented by a device, such as test control server 230. In some other implementations, system 500 may include functional components implemented by one or more devices, which include or exclude test control server 230. For example, CPE 210, ACS 220, and/or test execution server 240 may include some or all of the functional components of system 500.

As shown in FIG. 5, system 500 may include test response module 510, data repository 520, and data analysis module 530.

In some implementations, test response module 510 may receive a test request packet from CPE 210. As described above, test response module 510 may store information in the test request packet to form a test response packet. For example, test response module 510 may determine available network resources (e.g., bandwidth) of CPE 210, test execution server 240, and/or network 250 and may store information in the test response packet to authorize CPE 210 to perform a test based on the available network resources.

In one example implementation, test response module 510 may determine that a test requested to be performed by CPE 210 (e.g., based on a test type of the test request packet) may include a demand of 10 Mbps for 10 minutes. Test response module 510 may determine whether CPE 210, test execution server 240, and/or network 250 includes sufficient network resources such that CPE 210 may perform the test.

Additionally, or alternatively, test response module 510 may determine additional tests that CPE 210 may perform based on available network resources of CPE 210, test execution server 240, and/or network 250. For example, test response module 510, may determine that CPE 210 may perform an FTP download test when the available network resources relating to an FTP download test (e.g., download bandwidth, download latency, etc.) satisfies a particular threshold. In some other implementation, test response module 510, may determine that CPE 210 may perform an HTTP upload test when the available network resources relating to an HTTP upload test (e.g., upload bandwidth, upload latency, etc.) satisfies a particular threshold. In some implementations, test response module 510 may store information regarding tests that CPE 210 may perform in the test response packet and may provide the test response packet to CPE 210.

Data repository 520 may receive and/or store test results from CPE 210. For example, as described above, CPE 210 may perform a test by communicating with test execution server 240 and based on receiving the test response packet. In some implementations, data repository 520 may receive test results associated with a test performed by CPE 210. For example, data repository 520 may receive information regarding test results, such as "HTTP download test OK", "HTTP upload speed=10 Mbps," "FTP download speed=20 Mbps," etc. Additionally, data repository 520 may store information regarding a location (e.g., a geographic location or a network location) for CPE 210 associated with a set of test results.

Data analysis module 530 may perform a data analysis function based on information stored by data repository 520. For example, data analysis module 530 may determine averages, standard deviations, and/or some other statistical parameter associated with network performance of CPE 210 based on the information stored by data repository 520. In one example implementation, data analysis module 530 may determine an average HTTP download speed over some time with a particular standard deviation. Additionally, or alternatively, data analysis module 530 may determine statistical parameters for the performance of CPEs 210 associated with a particular location (e.g., a network location or a geographic location). In some implementations, network diagnostics may be based on information provided by data analysis module 530. For example, network outages associated with a particular location may be determined based on data analysis functions performed by data analysis module 530.

FIG. 6 illustrates a call flow diagram of example operations capable of being performed by an example portion 600 of environment 200. As shown in FIG. 6, portion 600 may include CPE 210, ACS 220, test control server 230, and/or test execution server 240. CPE 210, ACS 220, test control server 230, and/or test execution server 240 may include components and/or perform functions described above in connection with, for example, one or more of FIGS. 1-3. FIG. 6 may correspond to example operations to perform a test associated with CPE 210.

In some implementations, CPE 210 may send authentication request 610 to ACS 220 (e.g., to allow CPE 210 to communicate with network 250 to provide internet connection services to a user device. ACS 220 may send authentication response 615 to authenticate CPE 210 (e.g., based on authentication information regarding CPE 210 and stored by ACS 220, such as a device identifier, a MAC address, a WAN identifier, a serial number, and/or some other information regarding 210).

In some implementations, ACS 220 may send test toggle signal 620 to CPE 210 to direct CPE 210 to perform network testing functions (e.g., test request packet generation, test execution functions, etc.). As shown in FIG. 6, CPE 210 may generate test request packet 630 which may include information, such as a request to perform a test, types of tests to perform, and/or some other information. For example, CPE 210 may determine the types of tests to perform based on network capacity of CPE 210 and/or based on some other parameters. CPE 210 may provide test request packet 630 to test control server 230 at regular intervals (e.g., 1 hour intervals or some other interval) and when CPE 210 is considered to be in an idle state.

As further shown in FIG. 6, test control server 230 may receive test request packet 630 and may store information in test request packet 630 to form test response packet 640. As described above, test control server 230 may determine available network resources of CPE 210, test execution server 240, and/or network 250 and may store information in test response packet 640 to authorize CPE 210 to perform the test based on the available network resources. Additionally, or alternatively, test control server 230 may store information in test response packet 640 relating to test parameters, such as a test type (e.g., an HTTP upload test, an HTTP download test, a file transfer protocol (FTP) test, etc.), a URL of a particular test execution server 240 to communicate with as part of the test, and/or some other information (e.g., information to define test intervals in which subsequent tests may be performed by CPE 210). In some implementations, test control server 230 may determine the test parameters based on available network resources of CPE 210 and/or test execution server 240. Additionally, or alternatively, test control server 230 may determine the test parameters based on some other technique.

In some implementations, CPE 210 may receive test response packet 640 and may perform test execution instruction 650. Test execution instruction 650 may cause test execution module 420 to communicate with test execution server 240 (e.g., a server associated with the URL stored by the test response packet) to perform a test based on the test parameters stored by the test response packet. For example, CPE 210 may communicate with test execution server 240 (e.g., a server associated with the URL stored by the test response packet) to perform a test based on the test parameters stored by the test response packet. As shown in FIG. 6, CPE 210 and test execution server 240 may exchange network testing data 660 and network testing data 670 (e.g., data packets, and/or some other data) based on test execution instruction 650.

CPE 210 may generate test results packet 680 based on exchanging network testing data 660 and network testing data 670 with test execution server 240. In some implementations, CPE 210 may store test results packet 680 and provide test results packet 680 to test control server 230. Further, CPE 210 may determine information relating to a location (e.g., a geographic location and/or a network location) of CPE 210 and may store location information in a test location packet 690. Additionally, CPE 210 may provide test location packet 690 to test control server 230. In some implementations, network diagnostics and network performance by geographic location may be determined based on information stored by test results packet 680 and test location packet 690. In some implementations, test results packet 680 and/or test location packet 690 may be based on a test results packet associated the TR-143 standard and/or some other standard.

As shown in FIG. 6, test control server 230 may perform data analysis function 695 based on receiving test results packet 680 and test location packet 690 from CPE 210 as well as test result packets and test location packets received from other CPEs 210. As described above with respect to data analysis module 530, data analysis function 695 may determine averages, standard deviations, and/or some other statistical parameter associated with network performance of CPE 210 based on test results packet 680 received by CPE 210. In some implementations, network quality and/or network outages may be determined by location based on information provided by data analysis function 695.

Figure 7A:
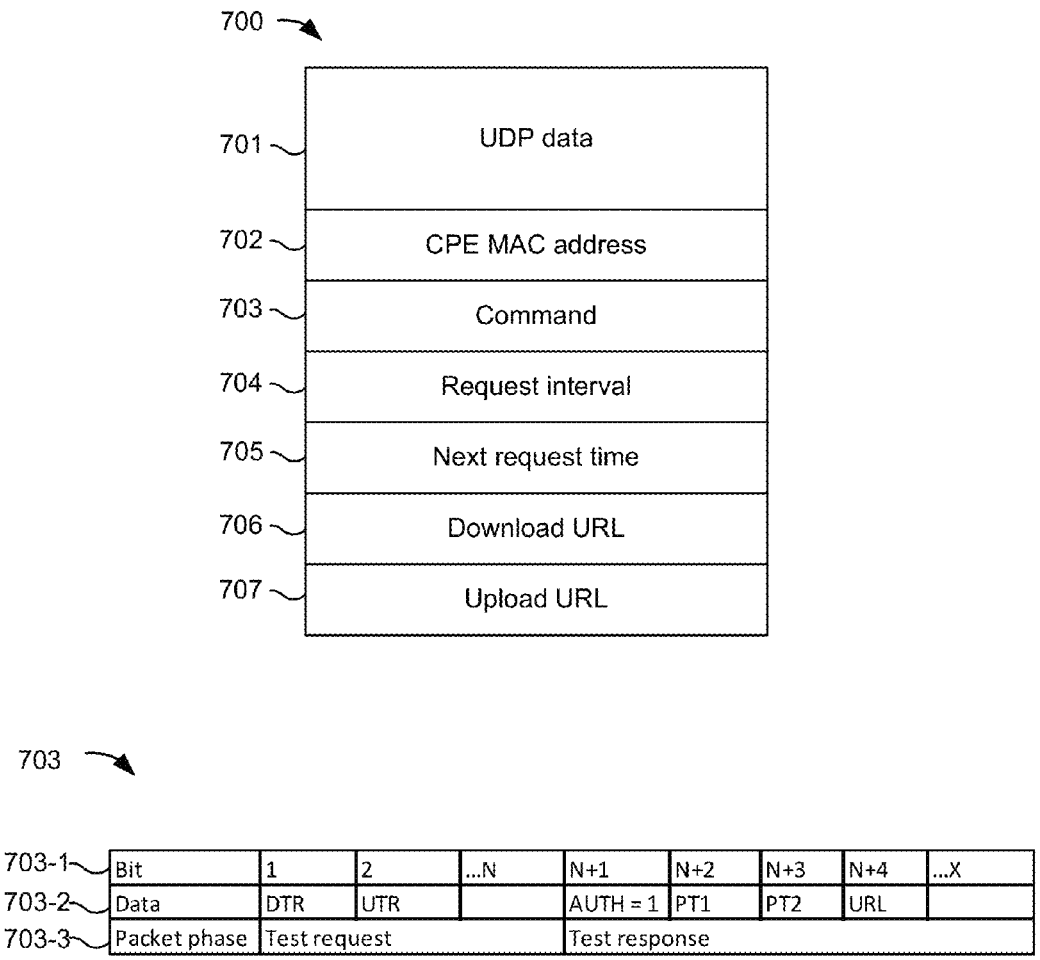
FIGS. 7A-7C illustrate example data structures that may be stored by a CPE and/or a test control server.
Figure 7B:
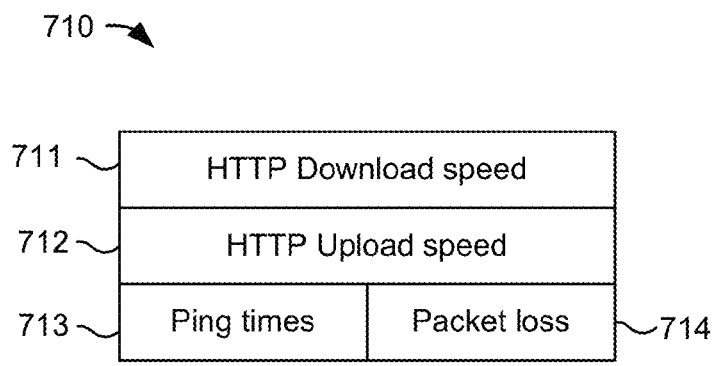
Figure 7C:
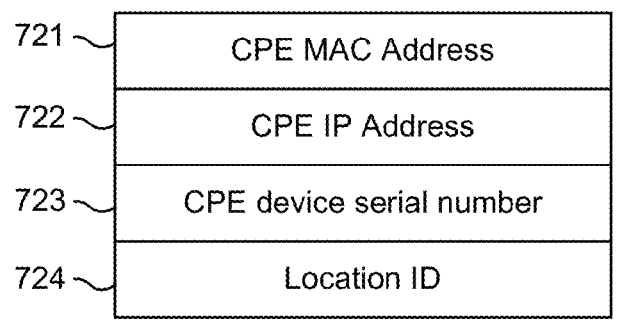

FIGS. 7A-7C illustrate example data structures 700, 710, and 720 that may be stored by one or more devices, such as CPE 210 and/or test control server 230. In one implementation, data structures 700-720 may be stored in a memory of CPE 210 and/or test control server 230. In another implementation data structures 700. 710 and 720 may be stored in a memory separate from, but accessible by CPE 210 and/or test control server 230. For example, data structures 700-720 may be stored by ACS 220 and/or test execution server 240. In some implementations, information stored by data structure 700 may correspond to information stored by test request packet 630 and/or test response packet 640. For example, CPE 210 may provide a portion of information stored by data structure 700 to form test request packet 630 and test control server 230 may provide another portion of information stored by data structure 700 to form test response packet 640.

In some implementations, information stored by data structure 710 may correspond to information stored by test results packet 680. In some implementations, information stored by data structure 720 may correspond to information stored by test location packet 690.

As shown in FIG. 7A, data structure 700 may include user datagram protocol (UDP) data field 701, CPE media access control (MAC) address field 702, command field 703, request interval field 704, next request time field 705, download URL field 706, and upload URL field 707. In some implementations, data structure 700 may include additional fields, fewer fields, different fields, or differently arranged fields than are shown in FIG. 7A.

UDP field 701 may include information corresponding to a UDP packet (e.g., a UDP packet header). For example, UDP field 701 may include information identifying a source port (e.g., a port of a device initiating communication with another device), a destination port (e.g., a port of a device receiving communication from another device), and/or some other information. In an example implementation, UDP field 701 may store information identifying a source port corresponding to a port used by CPE 210 when initiating communication with test control server 230 (e.g., when CPE 210 sends a test request packet to test control server 230). UDP field 701 may further store information identifying a destination port corresponding to a port used by test control server 210 when receiving a communication from CPE 210.

CPE MAC address field 702 may store a MAC address, or some other identifier, associated with CPE 210. In some implementations, information stored by CPE MAC address field 702 may be used to uniquely identify a CPE 210. In some implementations, information stored by CPE MAC address field 702 may be provided by CPE 210.

Command field 703 may store information regarding network test types requested, such as download test request (DTR), an upload test request (UTR), and/or some other test type. Additionally, command field 703 may store information identifying whether CPE is authorized to perform a network test, and may store information regarding test types. In some implementations, a portion of command field 703 may be provided by CPE 210 as part of test request packet 630. Additionally, another portion of command field 703 may be provided by test control server 230 as part of test response packet 640.

Request interval field 704 may store information identifying a time interval (e.g., a 30 minute interval, a 60 minute interval, or some other interval), at which CPE 210 may send a test request packet to test control server 230. Information stored by request interval field 704 may be provided by CPE 210 as part of test request packet 630.

Next request time field 705 may store information identifying a time in which CPE 210 may send a test request packet to test control server 230. Information stored by next request time field 705 may be provided by test control server 230 as part of test response packet 640. In some implementations, information stored by request interval field 704 and next request time field 705 may be used to distribute network load associated with test request packets received by test control server 230.

Download URL field 706 may identify a URL associated with a particular test execution server 240 with which CPE 210 may communicate to perform a download test. Information stored by download URL field 706 may be provided by test control server 230 as part of test response packet 640.

Upload URL field 707 may identify a URL associated with a particular test execution server 240 with which CPE 210 may communicate to perform an upload test. Information stored by upload URL field 707 may be provided by test control server 230 as part of test response packet 640.

As shown in FIG. 7A, command field 703 may include bit field 703-1, data field 703-2, and packet phase field 703-3. In some implementations, command field 703 may include additional fields, fewer fields, different fields, or differently arranged fields than are shown in FIG. 7A.

Bit field 703-1 may include information identifying a bit identifier associated with command field 703. For example, each bit may store a particular type of information. In an example implementation shown in FIG. 7, bits 1 through N (where N≥2) may store information identifying test types requested by CPE 210. Bits N+1 through X (where X≥N+2) may store information regarding test parameters and/or authorization data to authorize CPE 210 to perform the test.

Data field 703-2 may store information associated with a respective bit. For example, information stored by data field 703-2 relating to bit 1 may include information to identify a download test request (DTR) type. Information stored by data field 703-2 relating to bit 2 may include information to identify an upload test request (UTR) type. Information stored by data field 703-2 relating to bit N may include information to identify some other test type. In some implementations, data field 703-2 relating to bits N+1 through X may store information regarding test parameters and/or authorization data to authorize CPE 210 to perform the test. For example, as shown in FIG. 7A, data field 703-2 for bit N+1 may store the data "AUTH=1" to indicate that CPE 210 is authorized to perform a test. In another example, data field 703-2 for bit N+1 may store the data "AUTH=0" to indicate that CPE 210 is not authorized to perform a test. In an example shown in FIG. 7A, data field 703-2 for bit N+2 may store information identifying a first test parameter, such a first protocol type (PT1), data field 703-2 for bit N+3 may store information identifying a second test parameter, such a second protocol type (PT2), data field 703-2 for bit N+4 may store information identifying a third test parameter, such a URL identifying a particular test execution server 240 in which CPE 210 may perform a network test with. In some implementations, the protocol types may identify protocols CPE 210 may use when performing the test (e.g., an HTTP protocol, an FTP protocol, or some other protocol). In some implementations, data field 703-2 for bit X may store information identifying some other test parameter, such as a test type (e.g., a download test type or an upload test type).

Packet phase field 703-3 may store information to identify a phase associated with information stored by bit field 703-1 and data field 703-2. For example, as shown in FIG. 7A, information associated with bits 1 through N may correspond to information stored by test request packet 630 and provided by CPE 210. As further shown in FIG. 7A, information associated with bits N+1 through X may correspond to information stored by test response packet 640 and provided by test control server 230.

As shown in FIG. 7B, data structure 710 may include HTTP download speed field 711, HTTP upload speed field 712, ping times field 713, and packet loss field 714. In some implementations, data structure 710 may include additional fields, fewer fields, different fields, or differently arranged fields than are shown in FIG. 7B. As described above, information stored by data structure 710 may correspond to information stored by test results packet 680.

HTTP download speed field 711 may store information identifying a download speed of CPE 210 when CPE 210 performs a download speed test with test execution sever 240 using an HTTP protocol. For example, HTTP download speed field 711 may store a value, (e.g., in Mbps), to identify the HTTP download speed of CPE 210.

HTTP upload speed field 712 may store information identifying an upload speed of CPE 210 when CPE 210 performs an upload speed test with test execution sever 240 using an HTTP protocol. For example, assume that CPE 210 performs an upload speed test with test execution server 240 at a speed of 5 Mbps. HTTP upload speed field 712 may store the value 5 Mbps to identify the HTTP upload speed of CPE 210.

Ping times field 713 may store information identifying ping times between CPE 210 and test execution server 240 when CPE 210 performs a ping test (e.g., a latency test) with test execution sever 240. For example, CPE 210 may provide test execution server 240 with a ping query and test execution server may provide a ping response to CPE 210 based on receiving the ping query. Ping times field 713 may store values that identify amount of times (ping times) between when a ping query is sent by CPE 210 to test execution server 240 and when a ping response is received by CPE 210 from test execution server 240. For example, assume that CPE 210 performs a ping test with test execution sever 240 with ping times of 10 ms, 15 ms, and 25 ms. Ping times field 713 may store the values 10 ms, 15 ms, and 25 ms. In some implementations, ping times field 713 may store an average of multiple ping time values. In some implementations, ping times field 713 may store information relating to UDP echo, UDP echo plus, or some other information relating to ping times.

Packet loss field 714 may store information identifying packet loss data between CPE 210 and test execution server 240 when CPE 210 performs a packet loss test with test execution sever 240. For example, test execution sever 240 may provide, to CPE 210, information identifying a quantity of data to be sent from test execution sever 240 to CPE 210. CPE 210 may receive data, from test execution sever 240, and compare the quantity of received data to the quantity identified by test execution server 240. Assume, for example, that test execution server 240 identifies a quantity of 10 MB and CPE 210 receives a quantity of 9 MB. Thus, CPE 210 may determine that there was a loss of 10%. Packet loss field may store the value 10% to indicate a 10% packet loss between CPE 210 and test execution sever 240.

While particular test results packet are described above with respect to FIG. 7B, in practice, test results packet 680 and/or data structure 710 may include additional test results than those described above. For example, test results packet 680 and/or data structure 710 may include a file transfer protocol (FTP) download speed, an FTP upload speed, and/or some other test result information associated with CPE 210.

As shown in FIG. 7C, data structure 720 may include CPE MAC address field 721, CPE internet protocol (IP) address field 722 (e.g., an IP address associated with CPE 210), CPE device serial number field 723, location ID field 724. In some implementations, data structure 720 may include additional fields, fewer fields, different fields, or differently arranged fields than are shown in FIG. 7C. As described above, information stored by data structure 720 may correspond to information stored by test location packet 690.

CPE MAC address field 721 may store information associated with a MAC address of CPE 210. CPE IP address field 722 may store information to identify an IP address of CPE 210. For example, assume that CPE 210 has an IP address of 192.168.0.1. CPE IP address field 712 may store the IP address 192.168.0.1. Home device serial number field 723 may store information relating to a hardware serial number associated with CPE 210 to identify CPE 210.

Location ID field 724 may store information to identify a location (e.g., a geographic location and/or a network location) of CPE 210 and an advertised network speed for the location. For example, location ID field 724 may store information identifying a particular network device (e.g., a router, a switch, a gateway, etc.) with which CPE 210 is connected with (e.g., in order to allow CPE 210 to provide internet connection services). In some implementations, location information (e.g., geographic location information and/or network location information) for CPE 210 may be determined based on the particular network device with which CPE 210 is connected. Additionally, or alternatively, location ID field 724 may store some other information to identify a location associated with CPE 210, such as a geographic location of CPE 210 (e.g., a physical address, a partial address, such a zip code, etc.).

In some implementations, information stored by data structure 720 may be used to identify a location (e.g., geographic location and/or network location) associated with a set of test results stored by data structure 710 and/or test results packet 680. Further, information stored by data structure 720 may be used to evaluate network quality and/or identify network outages for particular geographic or network locations.

Figure 8:
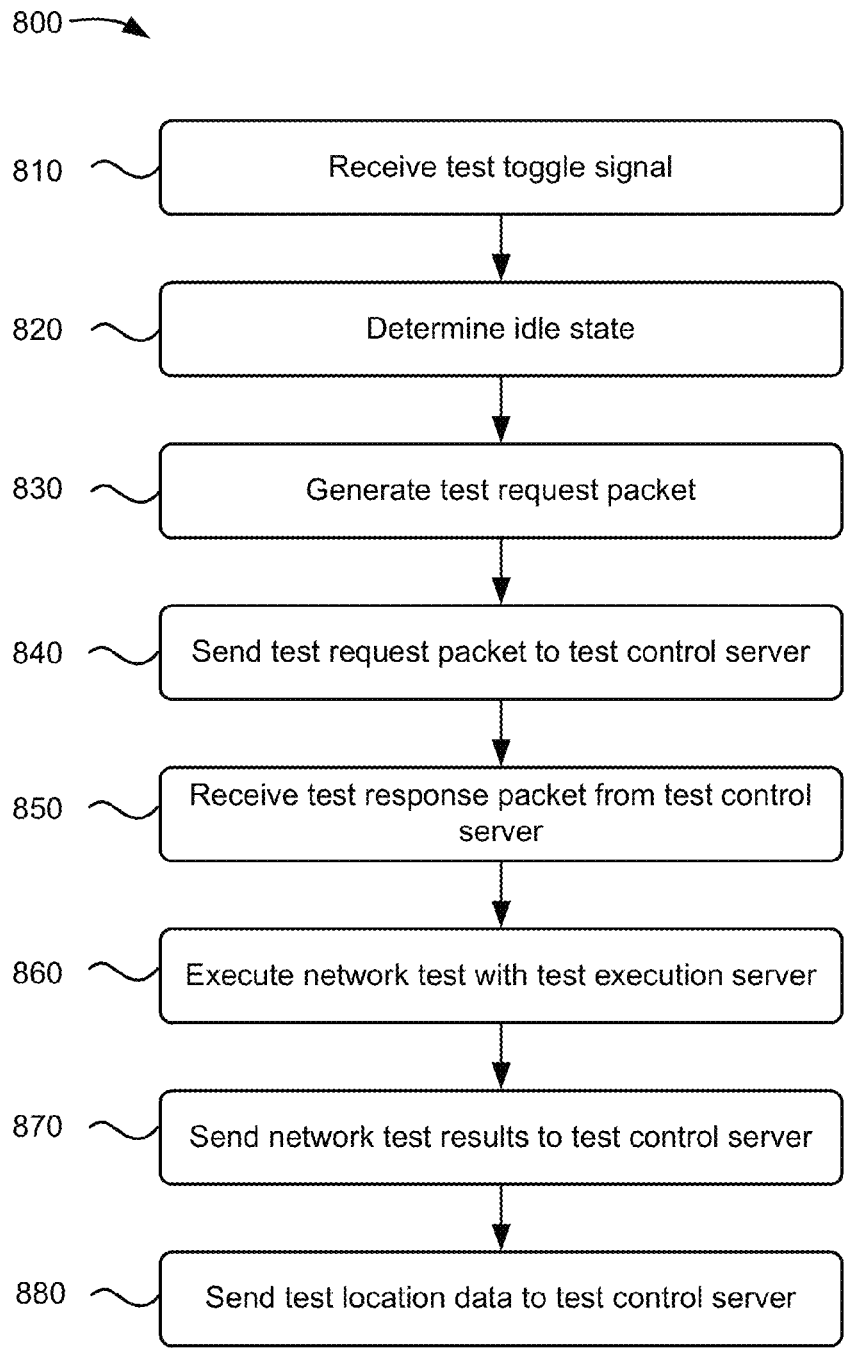
FIG. 8 illustrates a flowchart of an example process for performing a network test.

FIG. 8 illustrates a flowchart of an example process 800 for performing a network test. In one implementation, process 800 may be performed by one or more components of CPE 210, such as processor 310 of CPE 210. In another implementation, one or more blocks of process 800 may be performed by one or more components of another device (e.g., ACS 220, test control server 230, and/or test execution server 240), or a group of devices including or excluding CPE 210.

Process 800 may include receiving a test toggle signal (block 810). For example, CPE 210 may receive test toggle signal 620 from ACS 220 based on CPE 210 receiving authentication from ACS 220 to communicate with network 250. In some implementations, and as described above, CPE 210 may receive test toggle signal 620 from ACS 220 at any time to direct CPE 210 to perform network tests at a particular time, (e.g., to balance network resources associated with performing the network tests).

Process 800 may also include determining an idle state (block 820). For example, as described above with respect to test request module 410, CPE 210 may monitor network activity of CPE 210, and may identify when network activity of CPE 210 satisfies a threshold relating to when CPE 210 is considered to be in an idle state. For example, assume that a threshold of less than 10 megabytes of data transferred to/from CPE 210 within a 1 hour time interval may correspond to when CPE 210 is considered to be in an idle state.

CPE 210 may identify when less than 10 megabytes of data is transferred to/from CPE 210 within a 1 hour time interval. Additionally, or alternatively, CPE 210 may identify an idle state based on a utilization value of a link between CPE 210 and a provider's network associated with CPE 210. In some implementations, the idle state may relate to when user activity of CPE 210 is considered to be in an idle state.

Process 800 may further include generating a test request packet (block 830). For example, as described above with respect to test request module 410, CPE 210 may generate test packet 630 based on the test toggle signal directing test request module 410 to perform network test functions and based on determining that CPE 210 is in an idle state. As described above, test packet 630 may include information, such as a request to perform a test and types of tests to perform. In some implementations, CPE 210 may determine the types of tests to perform based on test intervals associated with respective test types. For example, CPE 210 may include instructions to request an HTTP upload test every 2 hours and may further include instructions to request an HTTP download test every 1 hour. An example schedule of tests CPE 210 may request is given in the table below:

| Test type | When requested |
| --- | --- |
| HTTP upload | Every 2 hours |
| HTTP download | Every 1 hour |
| FTP upload | Every 4 hours |
| FTP download | Every 3 hours |

Process 800 may also include sending the test request packet to a test control server (block 840). For example, as described above with respect to test request module 410, CPE 210 may provide a test request packet to test control server 230 at regular intervals (e.g., 1 hour intervals or some other interval) and when CPE 210 is considered to be in an idle state.

Process 800 may further include receiving a test response packet from the test control server (block 850). For example, as described above with respect to test execution module 420, CPE 210 may receive test response packet 640 from test control server 230 based on test request module 410 providing test request packet 630 to test control server 230. As described above, the test response packet may include information relating to test parameters, such as a test type (e.g., an HTTP upload test, an HTTP download test, a file transfer protocol (FTP) test, etc.), a URL of a particular test execution server 240 to communicate with as part of the test and/or some other information (e.g., information to define test intervals in which subsequent tests may be performed by CPE 210).

Process 800 may also include executing a network test with a test execution server (block 860). For example, as described above with respect to test execution instruction 650, CPE 210 may communicate with test execution server 240 (e.g., a server associated with the URL stored by the test response packet) to perform a test based on the test parameters stored by the test response packet. In some implementations, CPE 210 and test execution server 240 may exchange network testing data 660 and/or network testing data 670 (e.g., data packets, and/or some other data) based on test execution instruction 650.

Process 800 may further include sending network test results to the test control server (block 870). For example, as described above with respect to test execution module 420, CPE 210 may store test results packet 680 and provide test results packet 680 to test control server 230 based on executing the network test with test execution server 240.

In some implementations, CPE 210 may determine network test results, associated with an upload speed test, based on sending a test file having a particular file size to test execution server 240, receiving a response from test execution server 240 that the test file was received, and comparing a time in which the test file was sent with a time in which the response was received. For example, assume that, CPE 210 sends an upload test file having a 5 megabyte size at 12:00:00 and receives the response at 12:00:05. CPE 210 may determine an upload speed of 1 megabyte per second. Additionally, or alternatively, test execution server 240 may determine information regarding the upload speed and provide the information to CPE 210 and/or test control server 230.

In a similar manner, CPE 210 may determine network test results, associated with a download speed test, based on requesting a test file having a particular file size from test execution server 240, receiving the test file in its entirety from test execution server 240, and comparing a time in which the test file was requested with a time in which the test file was received in its entirety. For example, assume that, CPE 210 requests a test file having a 5 megabyte size at 12:00:00 and receives the test file in its entirety at 12:00:05. CPE 210 may determine a download speed of 1 megabyte per second. Additionally, or alternatively, test execution server 240 may determine information regarding the download speed and provide the information to CPE 210 and/or test control server 230.

In some implementations, CPE 210 may determine network tests results relating to a packet loss test and a ping test in a manner as described above with respect to data structure 710.

Process 800 may further include sending test location data to test control server 230 (block 880). For example, as described above, CPE 210 may generate test location packet 690 and provide test location packet 690 to test control server 230 based on executing the network test with test execution server 240.

Figure 9:
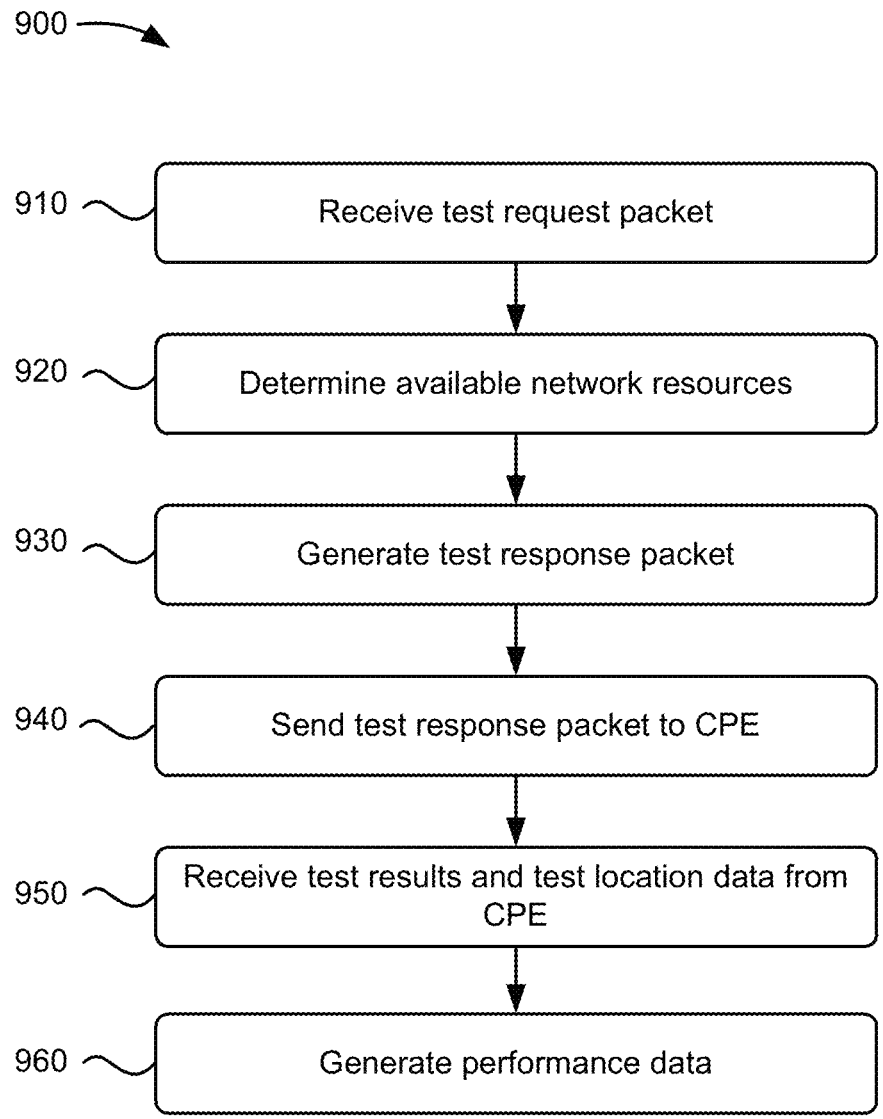
FIG. 9 illustrates a flowchart of an example process for authorizing a network test and receiving network test results.

FIG. 9 illustrates a flowchart of an example process for authorizing a network test and receiving network test results. In one implementation, process 900 may be performed by one or more components of test control server 230, such as processor 310 of test control server 230. In another implementation, one or more blocks of process 900 may be performed by one or more components of another device (e.g., CPE 210, ACS 220, and/or test execution server 240), or a group of devices including or excluding test control server 230.

Process 900 may include receiving a test request packet (block 910). For example, as described above with respect to test response module 510, test control server 230 may receive test request packet 630 from CPE 210 (e.g., when CPE 210 is considered to be in an idle state).

Process 900 may also include determining available network resources (block 920). For example, as described above with respect to test response module 510, test control server 230 may determine available network resources (e.g., bandwidth) of CPE 210, test execution server 240, and/or network 250. In one example implementation, test response module 510 may determine that a test to be performed by CPE 210 and associated with a test request packet may include a demand of 10 Mbps for 10 minutes. Test control server 230 may determine whether CPE 210, test execution server 240, and/or network 250 includes sufficient network resources such that CPE 210 may perform the test.

Process 900 may further include generating a test response packet (block 930). For example, as described above with respect to test response module 510, test control server 230 may receive test request packet 630 and may store information in test request packet 630 to form test response packet 640. In some implementations, test control server 230 may store information in test response packet 640 to authorize CPE 210 to perform the test based on the available network resources of test control server 230. Additionally, or alternatively, test control server 230 may store information in test response packet 640 relating to test parameters, such as a test type (e.g., an HTTP upload test, an HTTP download test, a file transfer protocol (FTP) test, a ping test, etc.), a URL of a particular test execution server 240 to communicate with as part of the test, and/or some other information (e.g., information to define test intervals in which subsequent tests may be performed by CPE 210).

As described above with respect to test response module 510, test control server 230 may determine test types that CPE 210 may perform based on available network resources associated with different test types. In some implementations, test response module 510 may initiate ping tests with multiple test execution servers 240 to identify a particular test execution server 240 (e.g., via a URL of test execution server 240) that CPE 210 may communicate with to perform a network test.

In some implementations, a test request packet may include a request for multiple test types. Test control server 230 may determine which of the requested tests CPE 210 may perform. For example, test control server 230 may parse the test request packet, identify network resources associated with performing each test, and prioritize the tests to be performed based on available network resources and/or based on some other parameter. As an example, assume that test control server 230 receives a test request packet that includes a request for an HTTP download test, an HTTP upload test, and FTP download test. Further, assume that the HTTP download test may require 10 mbps of network bandwidth, the HTTP upload test may require 5 mbps of network bandwidth, and that the FTP download test may require 15 mbps of network bandwidth. Further, assume that test execution server 240 has 16 mbps of available network bandwidth. Test control server 230 may determine that CPE 210 may perform only the HTTP upload test and HTTP download test. Alternatively, test control server 230 may determine that CPE 210 may perform only the FTP download test.

Process 900 may also include sending the test response packet to CPE 210 (block 940). For example, as described above with respect to test response module 510, test control server 230 may provide test response packet 640 based on generating test response packet 640 as described above.

Process 900 may further include receiving test results and test location data from CPE 210 (block 950). For example, as described above with respect to data repository 520, test control server 230 may receive and/or store test results packet 680 and test location packet 690 from CPE 210. For example, as described above, CPE 210 may perform a test by communicating with test execution server 240 and based on receiving test response packet 640. In some implementations, test control server 230 may receive test results packet 680 and test location packet 690 associated with a test performed by CPE 210. For example, test control server 230 may receive information regarding test results, such as "HTTP download test OK", "HTTP upload speed=10 Mbps," "FTP download speed=20 Mbps," etc. Additionally, test control server 230 may receive location information regarding CPE 210, such as a MAC address, an IP address, a device serial number, a location ID (e.g., a network location ID, a geographic location ID, etc.), an advertised network speed, and/or some other location information.

Process 900 may also include generating performance data (block 960). For example, as described above with respect to data analysis module 530, test control server 230 may determine averages, standard deviations, and/or some other statistical parameter associated with network performance of CPE 210 based on the information stored by data repository 520. In one example implementation, data analysis module 530 may determine an average HTTP download speed over a one week time period with a standard deviation. As described above, the performance data may identify whether CPE 210 is performing within operating parameters. For example, the performance data may identify whether the network speed, associated with CPE 210, satisfies a threshold (e.g., a threshold associated with an advertised network speed of the CPE).

Additionally, or alternatively, the performance data my identify network outages and/or network problems by network location and/or geographic location. In some implementations, network resources may be increased in locations (e.g., geographic locations and/or network locations) where the performance data identifies high network outages and/or network problems associated with the location.

As described above, CPE 210 may request to perform a test at regular intervals and when CPE 210 is considered to be in an idle state. CPE 210 may perform a test based on the information received and/or stored by test response packet 640. Additionally, CPE 210 may perform the test independently of ACS 220. As a result, tests for the CPE may be performed at regular intervals (e.g., at 1 hour intervals, or some other interval) and/or when the CPE is considered to be in an idle state while saving network load associated with ACS 220.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIGS. 8-9, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a device, a test signal from a first server,
the test signal directing the device to perform a network test, and
the first server being an auto-configuration server (ACS);
generating, by the device, a first packet based on receiving the test signal,
the first packet including a request for authorization to perform the network test;
providing, by the device, the first packet to a second server,
the second server being different from the first server;
receiving, by the device, a second packet from the second server based on providing the first packet to the second server,
the second packet including information authorizing the device to perform the network test and information identifying a third server;
communicating, by the first device, with the third server to perform the network test independently of the ACS,
the third server being different from the first server;
generating, by the first device, test results based on communicating with the third server to perform the network test; and
providing the test results to the second server,
the test results enabling the second server to generate performance data based on the test results.

2. The method of claim 1, further comprising:
monitoring network activity associated with the device; and
determining that the device is in an idle state based on monitoring the network activity associated with the device; and
where generating the first packet includes:
generating the first packet further based on the first device being in the idle state.

3. The method of claim 1, further comprising:
receiving authorization from the first server to communicate with a network,
where receiving the test signal from the first server occurs after receiving the authorization from the first server to communicate with the network.

4. The method of claim 1, where the first server, the second server, and the third server are associated with different parties.

5. The method of claim 1, where the first server, the second server, and the third server are associated with a same party.

6. A system comprising:
a device to:
receive a test signal from a first server,
the test signal directing the device to perform a network test, and
the first server being an auto-configuration server (ACS);
monitor network activity associated with the device;
determine that the device is in an idle state based on monitoring the network activity associated with the device;
generate a first packet based on receiving the test signal and based on determining that the device is in the idle state;
the first packet including a request for authorization to perform the network test;
provide the first packet to a second server,
the second server being different from the first server;
receive a second packet from the second server based on providing the first packet to the second server,
the second packet including information authorizing the device to perform the network test and information identifying a third server;
communicate with the third server to perform the network test independently of the ACS,
the third server being different from the first server;
generate test results based on communicating with the third server to perform the network test; and
provide the test results to the second server to enable the second server to generate performance data associated with the device.

7. The system of claim 6,
where the device is further to:
receive authorization from the first server to communicate with a network; and
where, when receiving the test signal from the first server, the device is further to:
receive the test signal from the first server after receiving the authorization from the first server to communicate with the network.

8. The system of claim 6, where the first server, the second server, and the third server are associated with different parties.

9. The system of claim 6, where the first server, the second server, and the third server are associated with a same party.

10. A non-transitory computer-readable medium storing instructions, the instructions comprising:
one or more instructions which, when executed by one or more processors associated with a device, cause the one or more processors to:
receive authorization from a first server to communicate with a network;
receive a test signal from the first server based on receiving the authorization from the first server to communicate with the network,
the test signal directing the device to perform a network test, and
the first server being an auto-configuration server (ACS);
generate a first packet based on receiving the test signal;
the first packet including a request for authorization to perform the network test;
provide the first packet to a second server,
the second server being different from the first server;
receive a second packet from the second server based on providing the first packet to the second server,
the second packet including information authorizing the device to perform the network test and information identifying a third server;
communicate with the third server to perform the network test independently of the ACS,
the third server being different from the first server;
generate test results based on communicating with the third server to perform the network test; and
provide the test results to the second server.

11. The non-transitory computer-readable medium of claim 10,
where the instructions further comprise:
one or more instructions which, when executed by the one or more processors, cause the one or more processors to:
monitor network activity associated with the device; and determine that the device is in an idle state based on monitoring the network activity associated with the device; and where the one or more instructions to generate the first packet include:
one or more instructions which, when executed by the one or more processors, cause the one or more processors to:
generate the first packet further based on determining that the device is in the idle state.

12. The non-transitory computer-readable medium of claim 10, where the network test includes one or more of:
a hypertext transfer protocol (HTTP) upload test,
an HTTP download test,
a file transfer protocol (FTP) upload test,
an FTP download test,
a domain name system (DNS) response test, or
a web page response test.

13. The non-transitory computer-readable medium of claim 10, where the network test includes one or more of:
a packet loss test,
a latency test,
a ping test, or
a user datagram protocol (UDP) echo test.

14. A method comprising:
receiving, by a first server, a first packet from a device based on the device receiving a test signal from a second server,
the first server being different from the second server,
the second server being an auto-configuration server (ACS), and
the first packet including information identifying a network test to be performed by the device;
storing, by the first server, information in the first packet to form a second packet,
the second packet including information identifying a third server and information regarding test parameters;
providing, by the first server, the second packet to the device,
the second packet enabling the device to use the third server to perform the network test in accordance with the test parameters and independently of the ACS; and
receiving, by the first server, test results from the device,
the test results being based on the device performing the network test.

15. The method of claim 14, further comprising:
determining, based on receiving the first packet, whether network resources, associated with one or more of the device, the first server, or the third server, are sufficient for performing the network test; and
generating an instruction based on determining whether the network resources are sufficient for performing the network test,
the instruction directing the device to perform the network test when the network resources are sufficient for performing the network,
the instruction preventing the device from performing the network test when the network resources are not sufficient for performing the network test, and
the storing the information in the first packet to form the second packet including:
storing the instruction in the first packet to form the second packet.

16. The method of claim 14, further comprising:
generating network performance data based on the test results.

17. The method of claim 14, where the network test includes one or more of:
a hypertext transfer protocol (HTTP) upload test,
an HTTP download test,
a file transfer protocol (FTP) upload test,
an FTP download test,
a domain name system (DNS) response test, or
a web page response test.

18. The method of claim 14, where the network test includes one or more of:
a packet loss test,
a latency test,
a ping test, or
a user datagram protocol (UDP) echo test.

19. A system comprising:
a first server to:
receive a first packet from a device based on the device receiving a test signal from a second server,
the first server being different from the second server,
the second server being an auto-configuration server (ACS), and
the first packet including information identifying a network test to be performed by the device;
determine, based on receiving the first packet, that network resources, associated with the device, are sufficient for performing the network test;
generate an instruction directing the device to perform the network test based on determining that the network resources are sufficient;
determine information regarding a third server and information regarding test parameters based on generating the instruction;
store information in the first packet to form a second packet,
the information including:
the instruction directing the device to perform the network test,
the information regarding the third server, and
the information regarding the test parameters;
provide the second packet to the device;
the network test being performed by the device in connection with the third server, independently of the ACS, in accordance with the test parameters, and based on the first server generating the instruction directing the device to perform the network test; and
receive test results from the device based on providing the second packet to the device.

20. The system of claim 19, where the first server is further to:
generate network performance data associated with the device based on the test results.

* * * * *